United States Patent
Li et al.

(10) Patent No.: US 11,263,225 B2
(45) Date of Patent: Mar. 1, 2022

(54) RANKING COMPUTER-IMPLEMENTED SEARCH RESULTS BASED UPON STATIC SCORES ASSIGNED TO WEBPAGES

(71) Applicant: Microsoft Technology Licensing, LLC, Redmond, WA (US)

(72) Inventors: Ziliu Li, Sammamish, WA (US); Junaid Ahmed, Bellevue, WA (US); Arnold Overwijk, Redmond, WA (US); Li Xiong, Kirkland, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 0 days.

(21) Appl. No.: 16/878,083

(22) Filed: May 19, 2020

(65) Prior Publication Data
US 2021/0365465 A1    Nov. 25, 2021

(51) Int. Cl.
*G06F 16/2457*    (2019.01)
*G06F 40/134*    (2020.01)
*G06F 16/955*    (2019.01)
*G06F 16/9538*    (2019.01)

(52) U.S. Cl.
CPC .... *G06F 16/24578* (2019.01); *G06F 16/9538* (2019.01); *G06F 16/9558* (2019.01); *G06F 40/134* (2020.01)

(58) Field of Classification Search
CPC ........... G06F 16/24578; G06F 16/9538; G06F 40/134; G06F 16/9558
See application file for complete search history.

(56) References Cited

U.S. PATENT DOCUMENTS

| | | | |
|---|---|---|---|
| 8,788,490 B1* | 7/2014 | Chatra | G06F 16/24578 707/726 |
| 2002/0107884 A1* | 8/2002 | Banerjee | G06F 16/957 715/206 |
| 2005/0027670 A1* | 2/2005 | Petropoulos | G06F 16/9535 |
| 2008/0270390 A1* | 10/2008 | Ward | G06F 16/951 |
| 2010/0131563 A1* | 5/2010 | Yin | G06F 16/355 707/794 |

(Continued)

OTHER PUBLICATIONS

"PageRank", Retrieved from: https://en.wikipedia.org/w/index.php?title=PageRank&oldid=921297017, Oct. 15, 2019, 11 Pages.

*Primary Examiner* — Asher D Kells
(74) *Attorney, Agent, or Firm* — Calfee, Halter & Griswold LLP; Michael J. Medley

(57) ABSTRACT

Technologies pertaining to ranking webpages in response to receipt of a query are described. A search engine receives a query and identifies webpages that are germane to the query. The search engine ranks the identified webpages to form a ranked list, wherein a first webpage is positioned in the ranked list based upon a static score assigned to the first webpage. The static score is based upon a weight assigned to a hyperlink in a second webpage, wherein the hyperlink points to the first webpage, and further wherein the weight is based upon a value of a feature of the hyperlink, such as a location of the hyperlink on the second webpage when the second webpage is rendered. Further, the second webpage includes several hyperlinks that point to different webpages, wherein each of the several hyperlinks has a different weight assigned thereto.

20 Claims, 8 Drawing Sheets

(56) References Cited

U.S. PATENT DOCUMENTS

| | | | |
|---|---|---|---|
| 2014/0143259 A1* | 5/2014 | Jain | G06F 16/951 |
| | | | 707/748 |
| 2015/0161135 A1* | 6/2015 | Ciccolo | G06F 40/143 |
| | | | 707/723 |
| 2015/0161281 A1* | 6/2015 | Seo | G06F 16/951 |
| | | | 707/706 |
| 2019/0012386 A1* | 1/2019 | Betz | G06F 16/9535 |

* cited by examiner

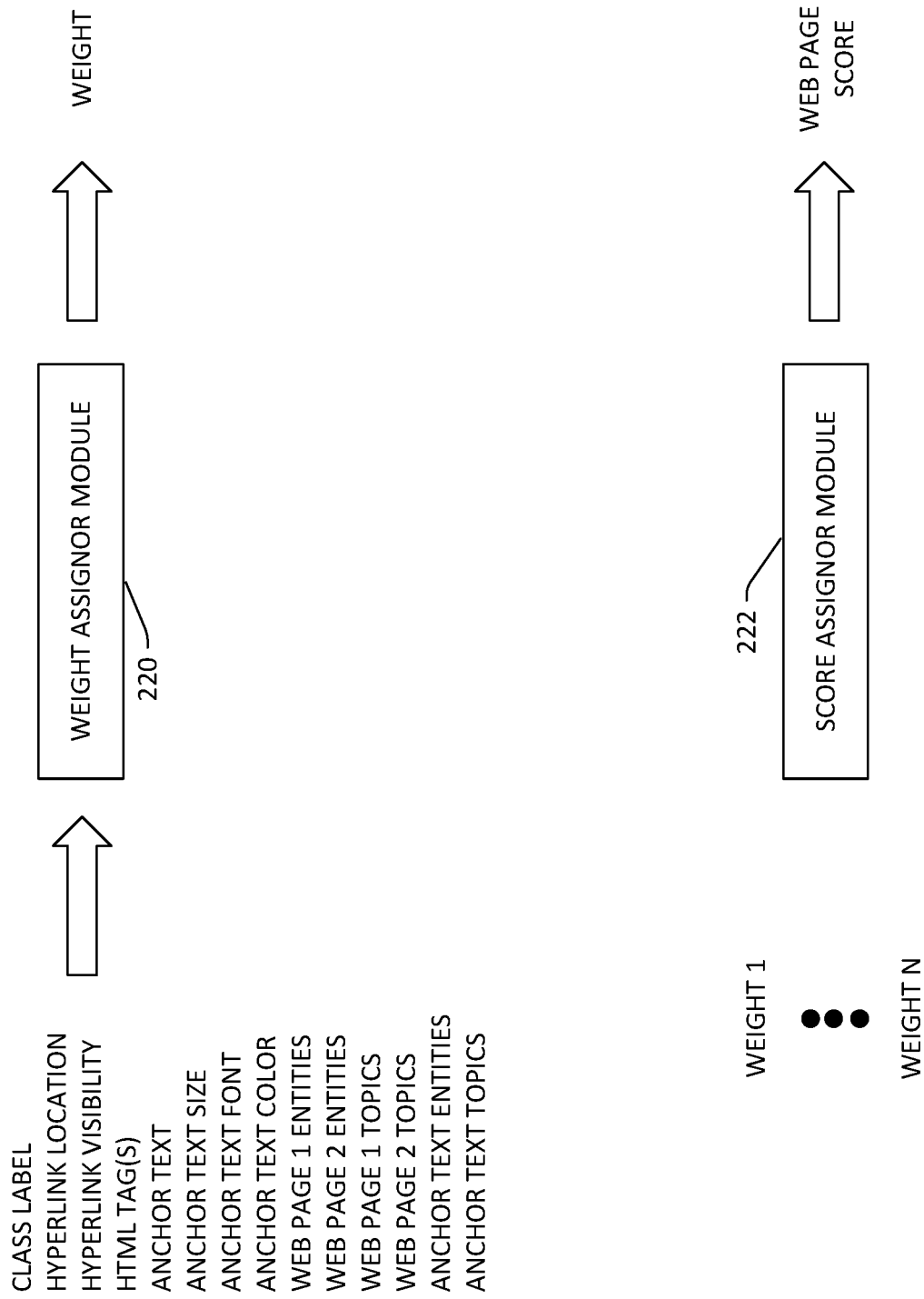

RANKING COMPUTER-IMPLEMENTED SEARCH RESULTS BASED UPON STATIC SCORES ASSIGNED TO WEBPAGES

BACKGROUND

A web search engine is configured to receive a query from a client computing device, search an index of webpages based upon the query to identify webpages that are germane to the query, and thereafter rank the webpages such that webpages identified by the web search engine as being most relevant to the query are positioned at the top of an ordered list of webpages while webpages that are less relevant to the query are positioned lower in the ordered list of webpages. A conventional web search engine is configured to consider several different features of webpages and/or a query when ranking the webpages based upon the query. An exemplary feature of a webpage that is considered by a conventional web search engine when ranking webpages is a static score assigned to the webpage. Generally, the static score assigned to the webpage is based upon a number of hyperlinks on other webpages that point to the webpage and static scores assigned to the other webpages.

Conventional web search engines tend to weight static scores assigned to webpages relatively heavily when ranking such webpages. Therefore, website designers often design websites such that at least one webpage of the website will have as high of a static score assigned thereto as possible, with the result being that the at least one webpage will, over time, be ranked relatively high in ranked lists of webpages returned by the search engine.

Conventionally, approaches for computing static scores for webpages have weighted hyperlinks on a webpage equally; for example, a first webpage may include four hyperlinks that point to four different webpages: a first hyperlink points to a second webpage (e.g., is an inlink to the second webpage), a second hyperlink points to a third webpage, a third hyperlink points to a fourth webpage, and a fourth hyperlink points to a fifth webpage. If these hyperlinks were the only hyperlinks on webpages in the World Wide Web that pointed to the second through fifth webpages, a conventional approach for computing static scores for webpages would assign each of such webpages the same static score, as the conventional approach weights each hyperlink in the first webpage equivalently.

As indicated above, the conventional approach for computing static scores for webpages has led website designers to manipulate design of websites in order to maximize static scores for webpages that belong to websites designed by such website designers (in order to increase traffic to webpages of the websites). For example, a website designer may construct a plurality of webpages that link to one another in a particular manner in an attempt to maximize a static score for a webpage, wherein the goal of the website designer is to cause the webpage to be positioned relatively high in ranked lists of search results (even when content of the webpage is not as relevant to a received query as a second webpage that is positioned lower in the ranked list of search results).

SUMMARY

The following is a brief summary of subject matter that is described in greater detail herein. This summary is not intended to be limiting as to the scope of the claims.

Described herein are various technologies pertaining to ordering webpages in a ranked list of webpages based upon static scores assigned to such webpages, wherein hyperlinks on a webpage that are employed to compute static scores are weighted differently from one another. In an example, a first webpage may include two hyperlinks: 1) a first hyperlink that points to a second webpage; and 2) a second hyperlink that points to a third webpage. First values for features pertaining to hyperlinks can be generated for the first hyperlink and second values for the features can be generated for the second hyperlink. Exemplary features of a hyperlink can include, but are not limited to: 1) a position of a hyperlink on a webpage; 2) a section of the webpage (e.g., title, header, body, sidebar, footer, etc.) that includes the hyperlink; 3) size of anchor text of the hyperlink; 4) color of the anchor text, amongst several other features. The hyperlinks in the first webpage are assigned weights based upon the values for the features for such hyperlinks. Therefore, the first hyperlink is assigned a first weight based upon the first values of the features, while the second hyperlink is assigned a second weight based upon the second values of the features. Because the first values of the features are different from the second values of the features, a first weight assigned to the first hyperlink and a second weight assigned to the second hyperlink are different. A first static score for the second webpage is computed based upon the first weight assigned to the first hyperlink and a second static score for the third webpage is computed based upon the second weight assigned to the second hyperlink. When the second webpage and the third webpage are identified by a search engine as being relevant to a received query, a ranker of the search engine can position the second webpage relative to the third webpage in the ranked list of webpages based upon the first static score assigned to the second webpage and the second static score assigned to the third webpage.

In a nonlimiting example, the first hyperlink may be positioned near the top of the first webpage and may be in a "title" section of the first webpage, and the second hyperlink may be positioned near a bottom of the first webpage and may be included in a "footer" section of the first webpage. The first webpage can be rendered, an image of the first webpage can be generated, and locations of the first hyperlink and the second hyperlink can be ascertained. Additionally, sections that include the first hyperlink and the second hyperlink can be identified based upon the image of the first webpage. In this example, because the first hyperlink is positioned near the top of the first webpage and is included in the "title" section of the first webpage, the first hyperlink can be assigned a relatively high weight. In contrast, because the second hyperlink is located near the bottom of the first webpage and further because the second hyperlink is in the "footer" section of the first webpage, the second hyperlink may be assigned a relatively low weight. Accordingly, a first weight assigned to the first hyperlink is higher than a second weight assigned to the second hyperlink. Put differently, the first hyperlink is treated as being more important than the second hyperlink when computing static scores for the second webpage and the third webpage. While position of the hyperlinks in the first webpage and sections to which the hyperlinks belong have been presented as exemplary features that can be considered when assigning weights to the hyperlinks, it is to be understood that several other features are contemplated, such as length of anchor text, semantics of the anchor text, color of the anchor text, size of the anchor text, HTML tags that correspond to the anchor text, whether the hyperlink is visible, whether the anchor text semantically corresponds with text surrounding the anchor text, whether one or more topics of the webpage that includes the hyperlink are also found in a webpage pointed to by the hyperlink, etc.

Weighting hyperlinks from a webpage differently based upon values for features corresponding to such hyperlinks provides various advantages over conventional approaches for assigning static scores to webpages. Experimentally, it has been shown that performance of a search engine is improved when ranking webpages based upon static scores for such webpages, wherein the static scores are computed with webpage hyperlinks being weighted differently from one another. In addition, by weighting a hyperlink in a webpage based upon values for features (rather than weighting all hyperlinks in the page equally) when computing static scores for webpages, it may be more difficult for website designers to manipulate static scores assigned to webpages.

The above summary presents a simplified summary in order to provide a basic understanding of some aspects of the systems and/or methods discussed herein. This summary is not an extensive overview of the systems and/or methods discussed herein. It is not intended to identify key/critical elements or to delineate the scope of such systems and/or methods. Its sole purpose is to present some concepts in a simplified form as a prelude to the more detailed description that is presented later.

BRIEF DESCRIPTION OF THE DRAWINGS

FIG. 5 is a functional block diagram of a weight assignor module that is configured to assign a weight to a hyperlink in a webpage based upon values of features corresponding to such hyperlink.

FIG. 6 is a functional block diagram of an exemplary score assignor module that is configured to assign a static score to a webpage based upon weights assigned to hyperlinks that point to such webpage.

DETAILED DESCRIPTION

Figure 1:
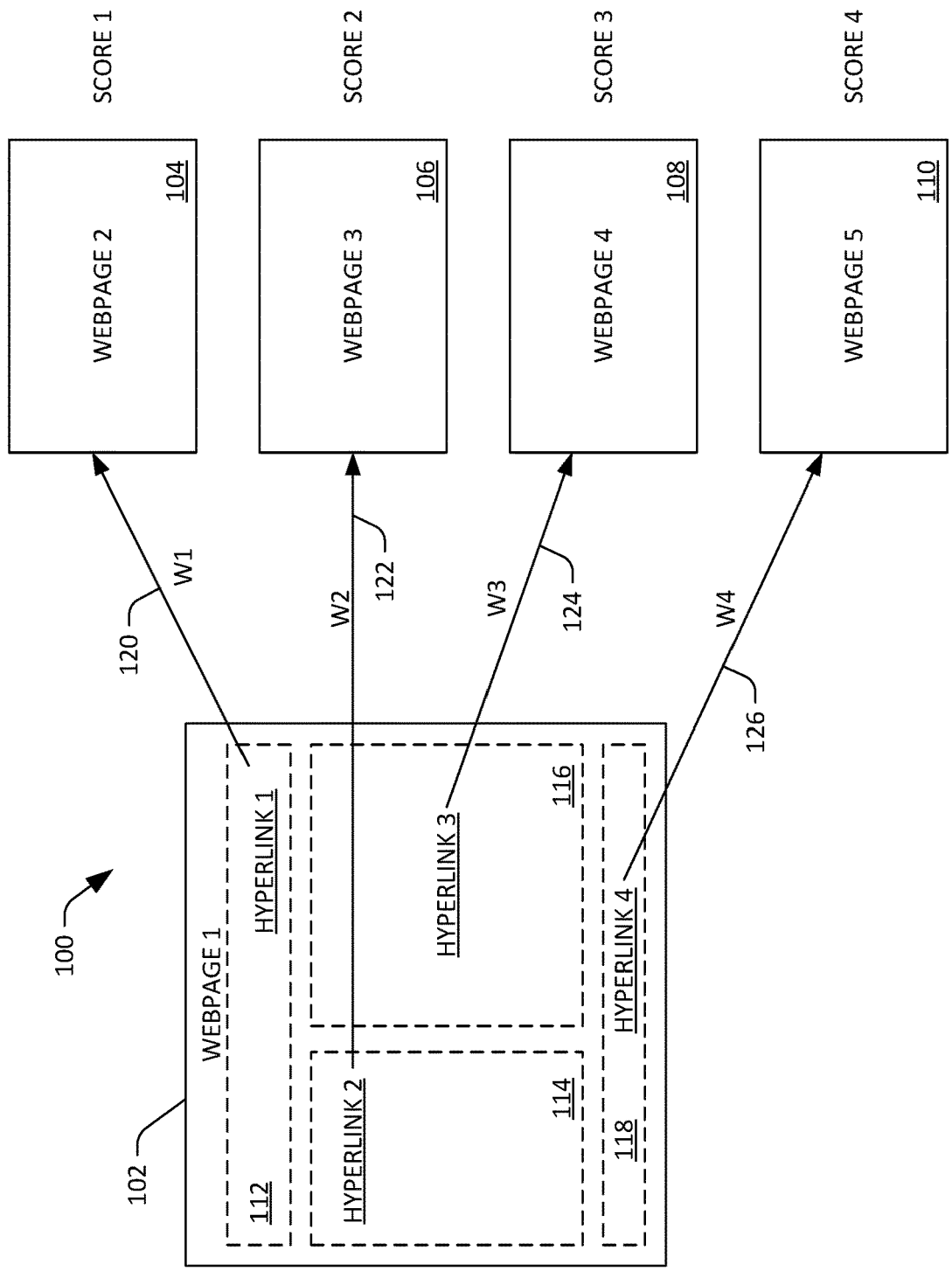
FIG. 1 is a schematic that depicts an exemplary web graph, wherein a webpage represented in the web graph includes four hyperlinks that point to four different webpages.

Various technologies pertaining to assigning static scores to webpages based upon weights assigned to hyperlinks are now described with reference to the drawings, wherein like reference numerals are used to refer to like elements throughout. In the following description, for purposes of explanation, numerous specific details are set forth in order to provide a thorough understanding of one or more aspects. It may be evident, however, that such aspect(s) may be practiced without these specific details. In other instances, well-known structures and devices are shown in block diagram form in order to facilitate describing one or more aspects. Further, it is to be understood that functionality that is described as being carried out by certain system components may be performed by multiple components. Similarly, for instance, a component may be configured to perform functionality that is described as being carried out by multiple components.

Moreover, the term "or" is intended to mean an inclusive "or" rather than an exclusive "or." That is, unless specified otherwise, or clear from the context, the phrase "X employs A or B" is intended to mean any of the natural inclusive permutations. That is, the phrase "X employs A or B" is satisfied by any of the following instances: X employs A; X employs B; or X employs both A and B. In addition, the articles "a" and "an" as used in this application and the appended claims should generally be construed to mean "one or more" unless specified otherwise or clear from the context to be directed to a singular form.

Further, as used herein, the terms "component", "module", and "system" are intended to encompass computer-readable data storage that is configured with computer-executable instructions that cause certain functionality to be performed when executed by a processor. The computer-executable instructions may include a routine, a function, or the like. It is also to be understood that a component or system may be localized on a single device or distributed across several devices. Further, as used herein, the term "exemplary" is intended to mean serving as an illustration or example of something, and is not intended to indicate a preference.

Various technologies pertaining to computing static scores for webpages and ranking webpages based upon static scores assigned thereto are described herein. Conventionally, hyperlinks on a webpage that point to other webpages are assigned equivalent weights, and static scores for the other webpages are computed based upon the equivalently-weighted hyperlinks. It can be ascertained, however, that "importance" of other webpages linked to the webpage can be different from one another, and such "importance" may be reflected based upon features of the hyperlinks that point to the other webpages. For example, a second webpage can be inferred to be fairly important from the perspective of the first webpage when the first webpage includes a hyperlink to the second webpage in a title of the first webpage. In contrast, a third webpage can be inferred to be fairly unimportant from the perspective of the first webpage when the first webpage includes a hyperlink to the third webpage in a sidebar of the third webpage. The technologies described herein allow for differentiated weighting of hyperlinks based upon values of features of such hyperlinks, wherein static scores for webpages pointed to by the hyperlinks are based upon weights assigned to such hyperlinks. Webpages may then be ranked by a ranker of a search engine based upon the static scores assigned thereto.

With reference now to FIG. 1, a schematic that depicts an exemplary web graph 100 is illustrated. The web graph 100 includes a first webpage 102, a second webpage 104, a third webpage 106, a fourth webpage 108, and a fifth webpage 110. The first webpage 102 includes a plurality of different sections; for example, the exemplary first webpage 102 includes a "title" section 112, a "sidebar" section 114, a "body" section 116, and a "footer" section 118.

The first webpage 102 includes several hyperlinks: a first hyperlink (represented by edge 120) in the "title" section 112 that points to the second webpage 104; a second hyperlink (represented by edge 122) in the "sidebar" section 114 that points to the third webpage 106; a third hyperlink (represented by edge 124) in the "body" section 114 that points to the fourth webpage 108; and a fourth hyperlink (represented by edge 126) in the "footer" section 118 that points to the fifth webpage 110.

In the exemplary web graph 100 depicted in FIG. 1, the hyperlinks 120-126 are the only hyperlinks that respectively point to the webpages 104-110. In other words, the first hyperlink 120 is the only inlink to the second webpage 104, the second hyperlink 122 is the only inlink to the third webpage 106, the third hyperlink 124 is the only inlink to the fourth webpage 108, and the fourth hyperlink 126 is the only inlink to the fifth webpage 110. If the conventional approach for computing static scores to the webpages 104-110 were employed, each of the webpages 104-110 would have an equivalent static score assigned thereto, because the conventional approach for computing static scores weights all hyperlinks on the first webpage 102 equally. In contrast to the conventional approach, the technologies described herein weight the hyperlinks 120-126 differently based upon values of features that correspond to such hyperlinks 120-126. In a nonlimiting example, features contemplated when assigning weights to hyperlinks include: 1) position of a hyperlink on the first webpage 102, and 2) an identity of a section of the first webpage 102 that includes the hyperlink.

Thus, with respect to the first hyperlink 120, values for the features may indicate that the first hyperlink 120 is located near a top of the first webpage 102 and is in the "title" section 112 of the first webpage 102. Similarly, values for the features of the second hyperlink 122 may indicate that the second hyperlink 122 is at an upper-middle vertical position on the first webpage 102 and is within the "sidebar" section 114 of the first webpage 102. With respect to the third hyperlink 124, values for the features can indicate that the third hyperlink 124 is vertically near a middle of the first webpage 102 and is in the "body" section 116 of the first webpage 102. Finally, the values for the features for the fourth hyperlink 126 can indicate that the fourth hyperlink 126 is vertically near a bottom of the first webpage 102 and is within the "footer" section 118 of the first webpage 102.

Because of the different values for the features with respect to the hyperlinks 120-126, the hyperlinks (the outlinks) are assigned different weights. For instance, the first hyperlink 120 is assigned a first weight, the second hyperlink 122 is assigned a second weight, the third hyperlink 124 is assigned a third weight, and the fourth hyperlink 126 is assigned a fourth weight. The second webpage 104 is assigned a first static score based upon the first weight, the third webpage 106 is assigned a second static score based upon the second weight, the fourth webpage 108 is assigned a third static score based upon the third weight, and the fifth webpage 110 is assigned a fourth static score based upon the fourth weight.

In a nonlimiting example, since the first hyperlink 120 is positioned in the first webpage 102 higher than the fourth hyperlink 126, and further since the first hyperlink 120 is included in the "title" section 112 while the fourth hyperlink 126 is included in the "footer" section 118, the first weight assigned to the first hyperlink 120 is greater than the fourth weight assigned to the fourth hyperlink 126. Thus, in the example shown in FIG. 1, the first static score computed for the second webpage 104 is higher than the fourth static score computed for the fifth webpage 110. When the second webpage 104 and the fifth webpage 110 are included in a set of search results, a ranker of a search engine can position the second webpage 104 and the fifth webpage 110 relative to one another based upon the first score assigned to the second webpage 104 and the fourth score assigned to the fifth webpage 110. Similar to the example set forth above with respect to the first hyperlink 120 and the fourth hyperlink 126, the third weight assigned to the third hyperlink 124 may be higher than the second weight assigned to the second hyperlink 122 due at least partially to the third hyperlink 124 being included in the "body" section 114 of the first webpage 102 rather than the "sidebar" section 116 of the first webpage 102 (where the second hyperlink 122 is located).

By computing a static score for a webpage based upon weights assigned to hyperlinks that point to that webpage, wherein such weights are based upon values for features corresponding to the hyperlinks, the static score computed for the webpage can better reflect the overall "importance" of the webpage on the World Wide Web. For example, a first webpage that has numerous hyperlinks that point thereto that are included in "title" sections of other webpages is likely more relevant to information seekers than a second webpage that has an equivalent number of hyperlinks that point thereto that are included in "sidebar" sections of the other webpages.

Figure 2:
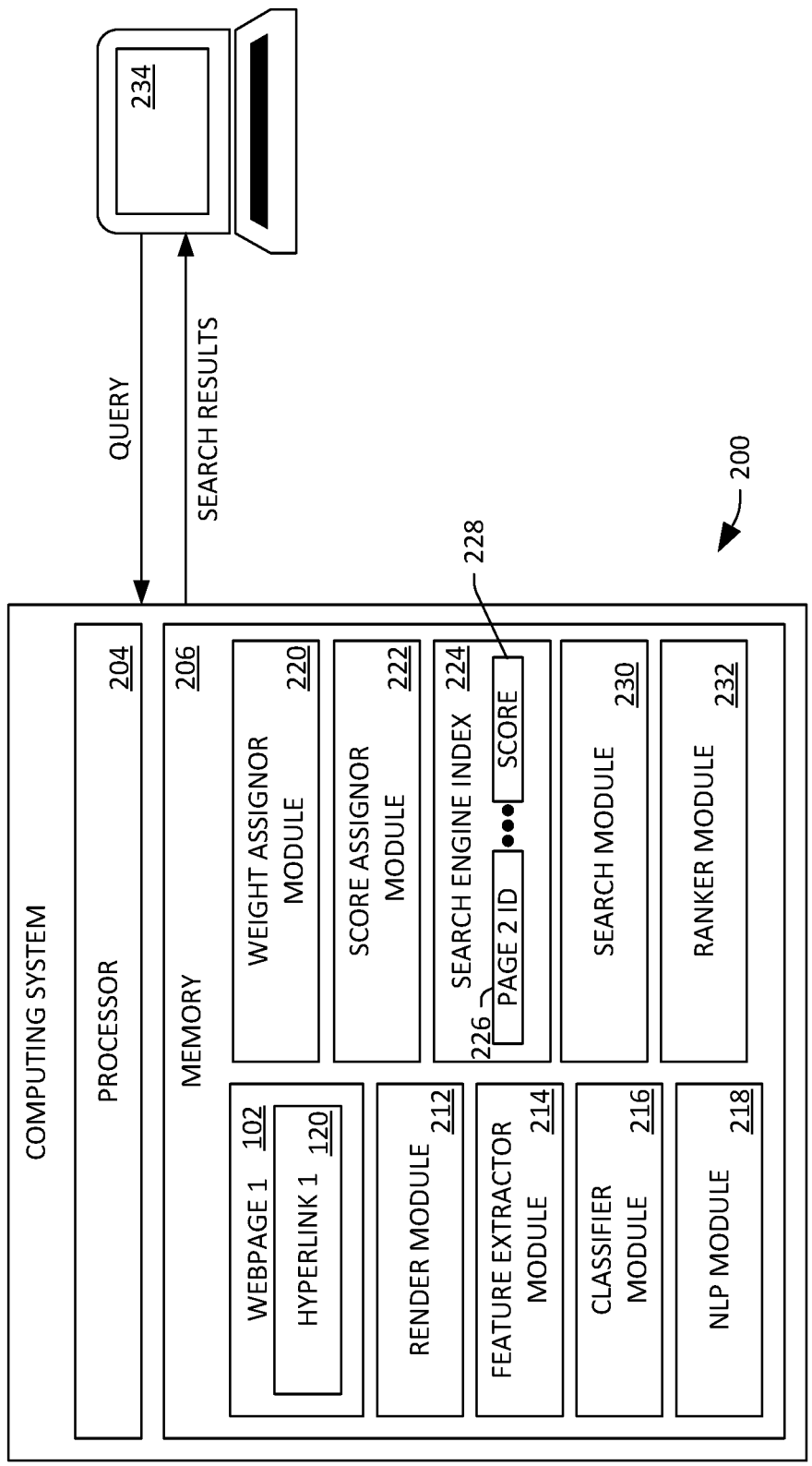
FIG. 2 is a functional block diagram of an exemplary system that facilitates assigning weights to hyperlinks of a webpage based upon values of features pertaining to such hyperlinks.

Now referring to FIG. 2, a functional block diagram of an exemplary computing system 200 is illustrated, wherein the computing system 200 facilitates ranking webpages in response to receipt of a query, and further wherein the webpages are ranked based upon static scores assigned to such webpages. The computing system 200 includes a processor 204 and memory 206. The memory 206 has, for example, the first webpage 102 loaded therein, wherein the first webpage 102 includes the first hyperlink 120 (and the hyperlinks 122-126, not shown in FIG. 2). As discussed above, the first hyperlink 120 points to the second webpage 104.

The memory 206 further includes several modules that are executed by the processor 204. For example, the memory 206 includes a render module 212 that is configured to render the first webpage 102 and generate an image of the rendered first webpage 102. For instance, the render module 212 can mimic operation of a web browser, retrieving and parsing HTML of the first webpage 102, retrieving and executing code corresponding to the first webpage 102, etc. In addition, upon the render module 212 rendering the first webpage 102, the render module 212 can generate an image of the rendered first webpage 102.

The memory 206 can further include a feature extractor module 214 that is configured to generate values for features of the first webpage 102 that correspond to the first hyperlink 120. Values for features generated by the feature extractor module 214 can include values retrieved from HTML of the first webpage 102 (such as HTML tags, text, etc.) and/or values that are ascertained based upon the image of the first webpage 102 generated by the render module 212. Exemplary features for which values can be generated by the feature extractor module 214 for the first hyperlink 120 in the first webpage 102 include, but are not limited to, a position of the first hyperlink 120 in the image of the first webpage 104 (e.g., X, Y coordinates that define location and size of a bounding box that encompasses the first hyperlink 120), anchor text of the first hyperlink 120, text surrounding the anchor text of the first hyperlink 120, an indication as to whether or not the first hyperlink 120 is visible in the image of the first webpage 102, tags (e.g. HTML tags) corresponding to the first hyperlink 102, other text in the first webpage 102, text of the second webpage 104 to which the first hyperlink 120 points, size of anchor text of the first hyperlink 120, color of anchor text of the first hyperlink 120, font of the anchor text of the first hyperlink 120, etc. The feature extractor module 214 can extract similar values for each hyperlink in the first webpage 102.

The memory 206 can further include a classifier module 216 that is configured to receive the image of the first webpage 102 generated by the render module 212 and identify different sections of the first webpage 102 in the image. For instance, webpages available by way of the World Wide Web tend to include different sections, such as, for example, "header" sections, "title" sections, "body" sections, "comments" sections, "sidebar" sections, "footer" sections, amongst other sections. The classifier module 216 is trained to automatically identify boundaries of sections in webpages and to further assign labels to such sections. Therefore, for instance, in the image of the first webpage 102 generated by the render module 212, the classifier module 216 can identify boundaries of the sections 112-118 in the first webpage 102, and can further assign labels to the identified boundaries (e.g., "title", "sidebar", "body", "footer"). In addition, the classifier module 216 can output the boundaries of the sections 112-118 (e.g., X,Y coordinates that define such boundaries) and the labels assigned to the sections 112-1118 to the feature extractor module 214. The feature extractor module 214, based upon the determined location of the first hyperlink 120 in the image of the first webpage 102 and further based upon the determined boundaries of the "title" section 112 (and label assigned to such section 112 by the classifier module 116), can generate an indication that the first hyperlink 120 is in the "title" section 112 of the first webpage 104 (rather than some other section).

The memory 206 may also include a natural language processing (NLP) module 218 that is configured to perform NLP with respect to text extracted from the first webpage 102 and/or the second webpage 104 by the feature extractor module 214. For instance, the NLP module 218 can perform named entity recognition with respect to text of the first webpage 102 and/or the second webpage 104 to which the first hyperlink 120 points (including named entity recognition over the anchor text of the first hyperlink 120). Further, the NLP module 218 can assign topics to text extracted from the first webpage 102 by the feature extractor module 214. In a nonlimiting example, the NLP module 218 can identify a topic to which anchor text of the first hyperlink 120 pertains. Further, the NLP module 218 can identify one or more topics in text that surrounds the anchor text of the first hyperlink 120 in the first webpage 104 (e.g., a sentence preceding the anchor text and a sentence following the anchor text). Further, the NLP module 218 may identify topics to which text of the second webpage 104 (pointed to by the first hyperlink 120) pertains. Moreover, in an exemplary embodiment, output of the NLP module 218 can be provided to the classifier module 216, wherein the classifier module 216 can assign labels to sections based upon output of the NLP module 218.

The memory 206 also comprises a weight assignor module 220 that is configured to assign the first weight to the first hyperlink 120 in the first webpage 102 based upon values of features generated by the feature extractor module 214, a label assigned to the first hyperlink 120 by the classifier module 216, and/or named entities and/or topics output by the NLP module 218. In an example, the weight assignor module 220 can assign the first weight to the first hyperlink 120 based upon a position of the first hyperlink 120 in the image of the first webpage 102 output by the render module 212 and the label "title" assigned to the section 112 (which includes the first hyperlink 120) by the classifier module 216. In another example, the weight assignor module 220 can assign the first weight to the first hyperlink 120 based solely upon the location of the first hyperlink 120 in the image of the first webpage 102. In yet another example, the weight assignor module 220 can assign the first weight to the first hyperlink 120 based upon whether or not the anchor text of the first hyperlink 120 references a named entity that is also referenced in a sentence that immediately precedes or immediately follows the anchor text in the first webpage 102. It is therefore to be understood that the weight assignor module 220 can assign the first weight to the first hyperlink 120 based upon a value of any of the features referenced above or any suitable combination of such values.

The memory 206 also comprises a score assignor module 222 that is configured to assign static scores to webpages based upon weights assigned to hyperlinks that point to such webpages. For example, the score assignor module 222 is configured to compute a static score for the second webpage 104 that is pointed to by the first hyperlink 120 based upon the first weight assigned to the first hyperlink 120 by the weight assignor module 220. Thus, the score assignor module 222 can assign the static score to the second webpage 104 based upon weights assigned to several hyperlinks on several webpages, wherein the several hyperlinks on the several webpages point to the second webpage 104.

The memory 206 can further include a search engine index 224. The search engine index 224 is an index of webpages that are available by way of the World Wide Web. The search engine index 224 includes an identifier 226 of the second webpage 104 that is pointed to by the first hyperlink 120 and a static score 228 computed for the second webpage 104 by the score assignor module 222, wherein the static score 228 is assigned to the identifier 226 of the second webpage 104. While the search engine index 224 is illustrated as including the static score 228, it is to be understood that the static score 228 may be included in a table or other data structure that is linked to the search engine index 224.

The memory 206 also includes a search module 230 that is configured to search over the search engine index 224 based upon queries received from client computing devices that are in communication with the computing system 200, wherein the search module 230 is configured to identify webpages represented in the search engine index 224 that are relevant to the queries. For example, the search module 230 can identify several webpages represented in the search engine index 224 based upon a query received from a client computing device. The memory 206 also includes a ranker module 232 that ranks (orders) webpages identified by the search module 230, wherein the ranker module 232 ranks the webpages based upon values of features of the query and values of features of the webpages returned by the search module 230. The features of the webpages include static scores assigned to the webpages (as computed by the score assignor module 222). Thus, the ranker module 232 ranks webpages based upon static scores assigned to the webpages by the score assignor module 222.

Exemplary operation of the computing system 200 is now set forth. A web crawler (not shown) can retrieve the first webpage 102 from the World Wide Web when crawling web pages. The render module 212 renders the first webpage 102 and generates an image of the first webpage 102, and the feature extractor module 214 generates values of features that correspond to the first hyperlink 120 in the first webpage 102 based upon: 1) information extracted from HTML of the first webpage 102; 2) information extracted from HTML of the second webpage 104 to which the first hyperlink 120 points; and/or 3) visual information ascertained by analyzing the image of the first webpage 102. The NLP module 218 is provided with text extracted from the first webpage 102 and/or the second webpage 104 by the feature extractor module 214, and outputs semantic information such as named entities in the text, sentiment of the text, topics corresponding to the text, and so forth. The classifier module 216 receives the image of the first webpage 102 output by the render module 212 and also optionally receives semantic information pertaining to text of the first webpage 102 output by the NLP module 218. Based upon the image of the first webpage 102 and optionally the aforementioned semantic information, the classifier module 216 outputs boundaries for the sections 112-118 and labels for such sections 112-118. The feature extractor module 214 assigns a section label ("title") to the first hyperlink 120 based upon the boundaries for the sections 112-118 and location of the first hyperlink 120 in the image of the first webpage 102.

The weight assignor module 220 assigns the first weight to the first hyperlink 120 based upon: 1) values of features corresponding to the first hyperlink 120 output by the feature extractor module 214 and/or 2) output of the NLP module 218. The score assignor module 222 computes a static score for the second webpage 104 based upon the first weight assigned to the first hyperlink 120 by the weight assignor module 220. The score assignor module 222 updates the search engine index 224 such that an identifier for the second webpage 104 has the static score 228 for the second webpage 104 as computed by the score assignor module 222 assigned thereto.

Subsequent to the search engine index 224 being updated to include the static score 228, the search module 230 receives a query from a client computing device 234. The search module 230 searches the search engine index 224 based upon the query and identifies a plurality of webpages that are germane to the query, wherein the plurality of webpages include the second webpage 104. The ranker module 232 positions the second webpage 104 in a ranked list of webpages based upon the static score 228 computed for the second webpage 104 by the score assignor module 222. The computing system 200 returns a ranked list of search results to the client computing device 234 for presentment to a user of the client computing device 234, wherein the ranked list of search results includes the second webpage 104 in the aforementioned position.

As indicated previously, experiments have indicated that ranking of webpages is improved when static scores assigned to webpages are based upon weights assigned to hyperlinks that point to such webpages, wherein the weights are computed based upon values of features that correspond to the hyperlinks. In addition, because weights assigned to hyperlinks can be based upon positions of hyperlinks in webpages and/or sections of webpages that include such hyperlinks, manipulating webpages and/or hyperlinks to artificially increase a static score for a webpage is rendered more difficult.

Figure 3:
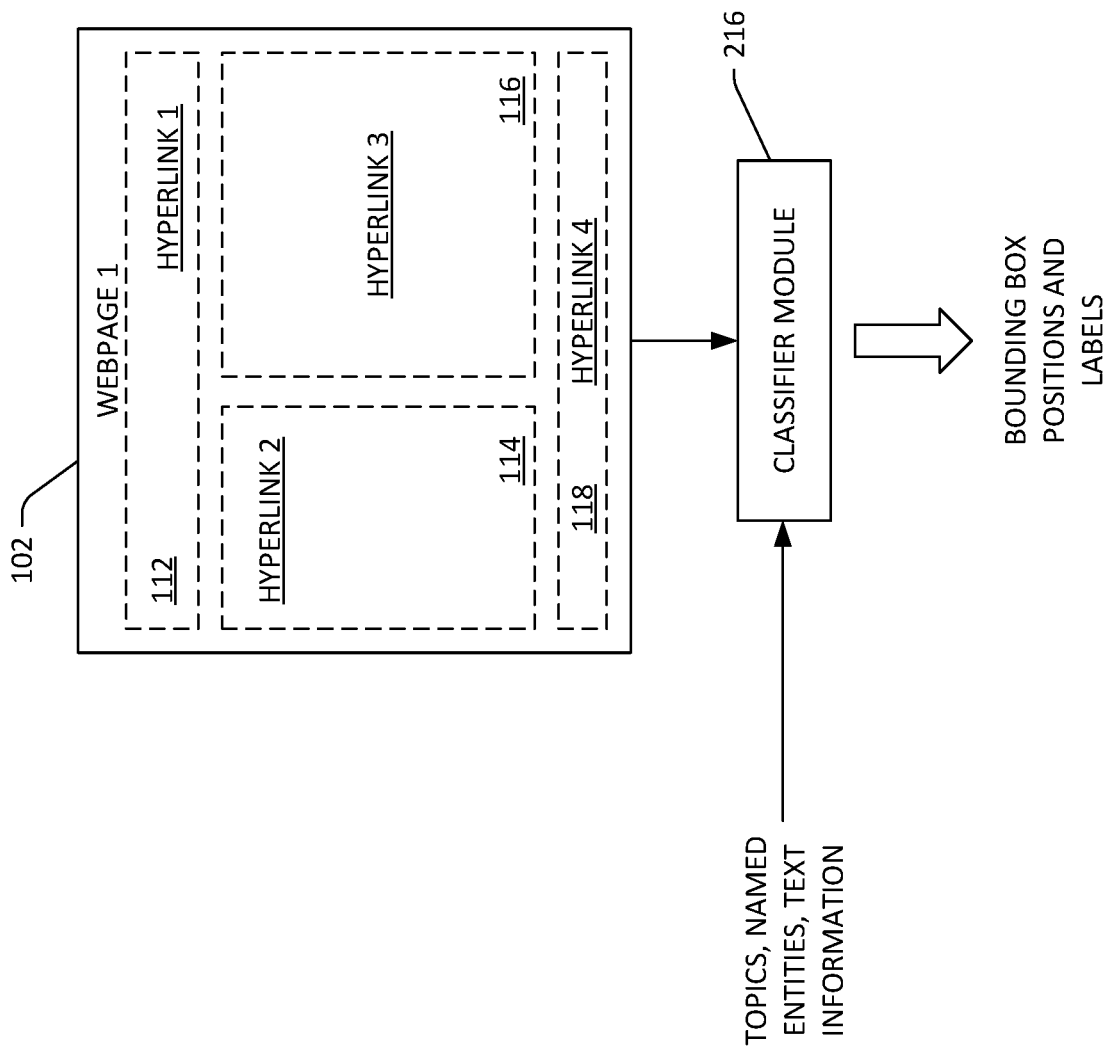
FIG. 3 is a schematic that depicts identification of different sections of a webpage.

Referring now to FIG. 3, a schematic depicting exemplary operation of the classifier module 216 is illustrated. The classifier module 216 can be or include a deep neural network (DNN) (wherein the term "DNN" includes recurrent neural networks, convolutional neural networks, recurrent convolutional neural networks, etc.), a regression tree, or other suitable classifier. The classifier module 216 can receive the image of the first webpage 102 as output by the render module 212, and can further optionally receive output of the NLP module 218 and/or the feature extractor module 214. Output of the NLP module 218 received by the classifier module 216 can include semantic information pertaining to text extracted from code of the first webpage 102, including topics, named entities, sentiment, etc. Output of the feature extractor module 214 received by the classifier module 216 can include size of text, fonts of text, stylistic features of text (bold, underline, italics), HTML tags assigned to text, and so forth.

In an exemplary embodiment, the classifier module 216 constructs bounding boxes (illustrated by dashed lines in the first webpage 102) based upon the image of the first webpage 102, wherein the bounding boxes are identified by the classifier module 216 as being boundaries of different sections of the first webpage 102. Based upon positions of such bounding boxes and information received from the NLP module 218 and/or the feature extractor module 216, the classifier module 216 can assign labels to the bounding boxes, wherein the labels identify sections of the first webpage 102. For example, passed upon position of the bounding box for the section 112, and further based upon semantic information for text included within such bounding box, the classifier module 216 can assign the label "title" to the section 112. In another example, based upon the position of the bounding box for the section 114, and further based upon semantic information for text included within such bounding box (e.g., the text includes a list of items with no coherent topical theme), the classifier module 216 can assign the label "sidebar" to the section 114. The classifier module 216 can output the positions of the bounding boxes for the sections 112-118 and the labels for such sections to the feature extractor module 214, which can assign section labels to hyperlinks based upon determined positions of such hyperlinks in the image of the first webpage 102 and positions of the bounding boxes for the sections 112-118.

Figure 4:
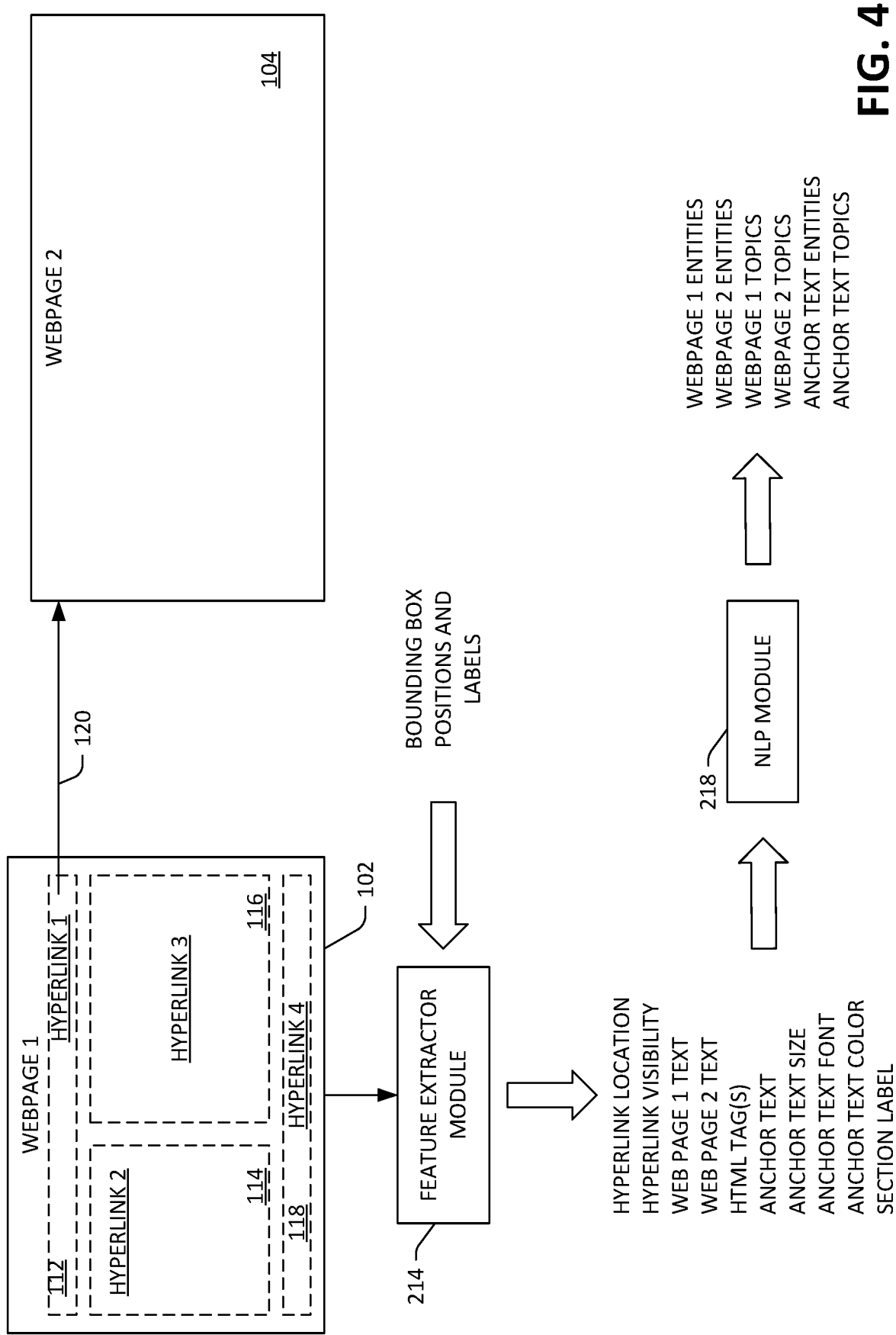
FIG. 4 is a schematic that depicts generation of values for features with respect to a hyperlink in a webpage.

Referring now to FIG. 4, a schematic depicting operation of the feature extractor module 214 and the NLP module 218 is illustrated. As described above with respect to FIG. 1, the first webpage 102 includes the first hyperlink 120, wherein the first hyperlink 120 points to the second webpage 104. The feature extractor module 214 can parse HTML (or other code) of the first webpage 102 and generate values for features pertaining to the first webpage 102 based upon such parsing. In addition, the feature extractor module 214 can receive the image of the first webpage 102 as output by the render module 212 and can generate values for features based upon the image. Exemplary features for which values can be generated by the feature extractor module 214 with respect to the first hyperlink 120 include, but are not limited to, a location of the first hyperlink 120 in the image of the first webpage 102 (e.g., X, Y coordinates), an indication as to whether or not the first hyperlink 120 is visible in the image of the first webpage 102, text of the first webpage 102 (which may be limited to a threshold number of sentences before and/or after the first hyperlink 120), text of the second webpage 104 pointed to by the first hyperlink 120, HTML tags that correspond to the first hyperlink 120, anchor text of the first hyperlink 120, size of the anchor text of the first hyperlink 120, font of the anchor text of the first hyperlink 120, color of the anchor text of the first hyperlink 120, and so forth. In addition, the feature extractor module 214 can receive the bounding box positions and labels assigned to such positions from the classifier module 214. Based upon the position of the bounding box for the section 112, and further based upon the location of the first hyperlink 120 in the image of the first webpage 102, the feature extractor module 214 can assign the label "title" (assigned to the section 112 by the classifier module 216) to the first hyperlink 120.

At least some of the information generated by the feature extractor module 214 is provided to the NLP module 218. For example, the NLP module 218 can receive the text of the first webpage 102 extracted by the feature extractor module 214 and the text of the second webpage 104 extracted by the feature extractor module 214. The NLP module 218, for example, can perform named entity recognition with respect to the text extracted from the first and second webpages 102 and 104, such that the NLP module 218 outputs a first set of named entities identified in the text of the first webpage 102 and a second set of named entities identified in the text of the second webpage 104.

In another example, the NLP module 218 can identify a first set of topics to which the text in the first webpage 102 pertains and a second set of topics to which text in the second webpage 102 pertains. Moreover, the NLP module 218 can receive the anchor text of the first hyperlink 120 extracted from the first webpage 102 by the feature extractor module 214 and can identify named entities in such anchor text (if any) and/or topics that pertain to the anchor text of the first hyperlink 120. As noted above, output of the NLP module 218 can be provided to the classifier module 216, which can employ such information in connection with assigning labels to sections in the first webpage 102. As will be described below, the weight assignor module 220 can assign a weight to the first hyperlink 120 based upon the values of the features generated for the first hyperlink 120 by the feature extractor module 214 and/or the semantic information output by the NLP module 218 (e.g., the named entities identified in the text of the first webpage 102, the named entities identified in the text of the second webpage 104, etc.).

With reference to FIG. 5, a schematic illustrating exemplary operation of the weight assignor module 220 is depicted. With respect to the first hyperlink 120, for example, the weight assignor module 220 receives values of features that pertain to the first hyperlink 120 generated by the feature extractor module 214 and/or semantic information output by the NLP module 218, and the weight assignor module 220 assigns the first weight to the first hyperlink 120 based upon the received values and/or the received semantic information. With more particularity, the weight assignor module 220 can receive the class label ("title") assigned to the first hyperlink 120 and can assign the weight to the first hyperlink 120 based upon such class label. As indicated previously, the weight assignor module 220 can assign higher weights to hyperlinks that have the "title" class label assigned thereto than hyperlinks that have the "sidebar", "footer", or "header" class labels assigned thereto.

In another example, the weight assignor module 220 can receive the location of the first hyperlink 120 in the image of the first webpage 102 and can assign the weight to the first hyperlink 120 based upon such location. For example, the weight assignor module 220 can assign a relatively high weight to the first hyperlink 120 due to the first hyperlink 120 being positioned vertically at an upper part of the first webpage 102 and horizontally at a center of the first webpage 102.

Further, the weight assignor module 220 can receive the indication as to whether or not the first hyperlink 120 is visible in the image of the first webpage output by the render module 212. The weight assignor module 220 can assign a higher weight to the first hyperlink 120 when it is visible in the image of the first webpage 102 compared to when the first hyperlink 120 is not visible in the image of the first webpage 102. The weight assignor module 220 can additionally receive size of the anchor text of the first hyperlink 120 and can assign the weight to the first hyperlink 120 based upon the size of the anchor text. For example, the larger the size of the anchor text of the first hyperlink 120 the larger the weight that is assigned to the first hyperlink 120 by the weight assignor module 220.

The weight assignor module 220 can additionally receive information with respect to font and/or style of the anchor text of the first hyperlink 120, wherein such information can include font family, whether the font is bolded, underlined, italicized, and so forth. For example, the weight assignor module 220 can assign higher weights to hyperlinks that are in bold than weights assigned to hyperlinks that are not in bold. In another example, the weight assignor module 220 can assign higher weights to hyperlinks in a first font family when compared to weights assigned to hyperlinks in a second font family In addition, the weight assignor module 220 can receive information as to color of the anchor text of the first hyperlink 120 and can assign the weight to the first hyperlink 120 based upon color of such anchor text. For instance, the weight assignor module 220 may assign higher weights to hyperlinks having anchor text of a first color when compared to hyperlinks having anchor text of a second color. Further, the weight assignor module 220 can consider contrast between the color of the anchor text of the first hyperlink 120 compared to background of the first webpage 102 when assigning the first weight to the first hyperlink 120 (with the weight assignor module 220 assigning increasing weight as contrast increases). Moreover, the weight assignor module 220 can consider contrast between the color of the anchor text of the first hyperlink 120 compared to text surrounding the anchor text in the first webpage 102 (with the weight assignor module 220 assigning increasing weight as contrast increases).

The weight assignor module 220, in yet another example, can assign the first weight to the first hyperlink 120 based upon output of the NLP module 218. For example, the weight assignor module 220 can receive first named entities from the first webpage 102 and second named entities from the second webpage 104 and can assign the first weight to the first hyperlink 120 based upon an amount of overlap between the first named entities and the second named entities, wherein the first weight increases as the amount of overlap between the first named entities and the second named entities increases. In another example, the weight assignor module 220 can receive first topics that have been identified by the NLP module 218 as being germane to text of the first webpage 102 and can further receive second topics identified by the NLP module 218 as being germane to text of the second webpage 104. The weight assignor module 220 can assign the first weight to the first hyperlink 120 based upon the amount of overlap between the first topics and the second topics (with the weight assignor module 220 assigning increasing weight as the amount of overlap between the first and second topics increases).

In still yet another example, the weight assignor module 220 can assign the first weight to the first hyperlink 120 based upon a comparison between named entities in the anchor text of the first hyperlink 120 and named entities in text of the first webpage 102, wherein the weight assignor module 220 assigns a higher weight when there is a match between named entities compared to when there is no match. For example, when a named entity in the anchor text of the hyperlink 120 matches a named entity in the text of the first webpage 102 it can be inferred that the hyperlink is germane to content of the first webpage 102 and therefore not likely to have been added to artificially inflate a static score for the second webpage 104. Similarly, the weight assignor module 220 can assign the first weight to the first hyperlink 120 based upon a comparison between named entities in the anchor text of the first hyperlink 120 and named entities in text of the second webpage 104, wherein the weight assignor module 220 assigns a higher weight when there is a match between named entities compared to when there is no match. When a named entity in the anchor text of the first hyperlink 120 matches a named entity in the text of the second webpage 104, it can be inferred that the content of the first webpage 102 is germane to content of the second webpage 104 and that the first hyperlink 120 was not added to the first webpage 102 to artificially inflate the static score for the second webpage 104.

Similarly, the weight assignor module 220 can assign the weight to the first hyperlink 120 based upon a comparison between a topic identified by the NLP module 218 as being germane to the anchor text of the first hyperlink 120 and topics identified by the NLP module 218 as being germane to the content of the first webpage 102 and/or content of the second webpage 104. The weight assignor module 220 can assign a relatively high weight to the first hyperlink 120 when a topic germane to the anchor text of the first hyperlink 120 has also been identified by the NLP module 218 as being germane to content of the first webpage 102 and/or the second webpage 104. As indicated previously, the weight assignor module 220 can assign the first weight to the first hyperlink 120 based upon any of the features described above individually or any suitable combination of such features. In an exemplary embodiment, the weight assignor module 220 can be a machine learned model that has been trained based upon discounted cumulative gain scores assigned to ranked lists of search results, wherein the search results are ranked based upon static scores assigned to webpages, and further wherein the static scores are based upon weights assigned to inlinks to the webpages.

Now referring to FIG. 6, a schematic depicting exemplary operation of the score assignor module 222 is illustrated. The score assignor module 222, in this example, is configured to compute a score for the second webpage 104, wherein the score is based upon weights assigned to hyperlinks that point to the second webpage 104. For instance, the score assignor module 222 can assign the score to the second webpage 104 based upon the first weight assigned to the first hyperlink 120 (in the first webpage 102) by the weight assignor module 220. The score assignor module 222 assigns the score to the second webpage based upon weights of each in link to the second webpage. The score assignor module 222 can then update the search engine index 224 to include the score computed for the second webpage 104.

Figure 7:
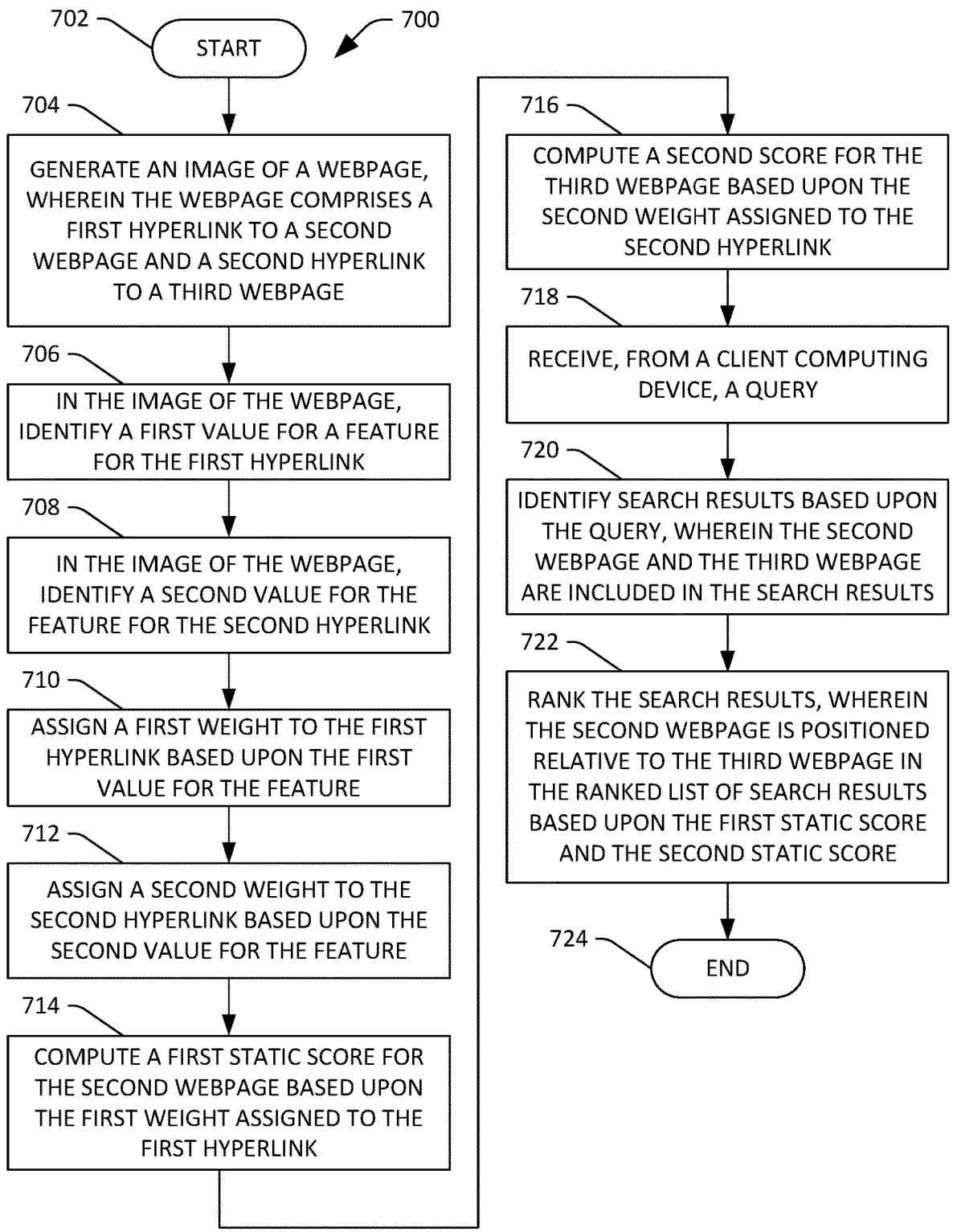
FIG. 7 is a flow diagram illustrating an exemplary methodology for ranking webpages based upon static scores assigned to such webpages.
Figure 8:
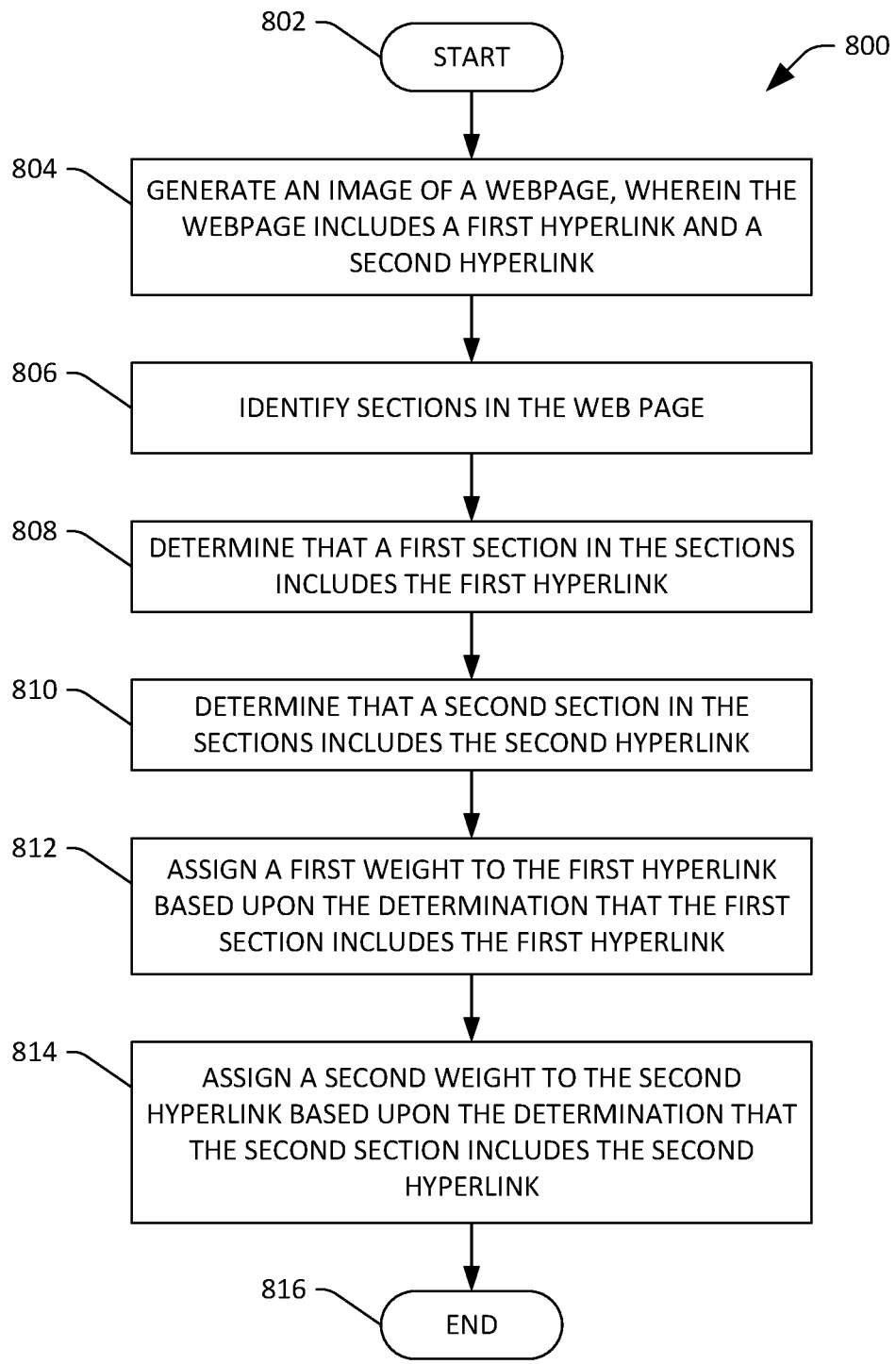
FIG. 8 is a flow diagram illustrating an exemplary methodology for assigning different weights to hyperlinks on a webpage, wherein such weights are used to compute static scores for webpages that are pointed to by such hyperlinks.

FIGS. 7 and 8 illustrate exemplary methodologies relating to ranking webpages based upon static scores assigned thereto, wherein the static scores are computed based upon weights assigned to inlinks to such webpages. While the methodologies are shown and described as being a series of acts that are performed in a sequence, it is to be understood and appreciated that the methodologies are not limited by the order of the sequence. For example, some acts can occur in a different order than what is described herein. In addition, an act can occur concurrently with another act. Further, in some instances, not all acts may be required to implement a methodology described herein.

Moreover, the acts described herein may be computer-executable instructions that can be implemented by one or more processors and/or stored on a computer-readable medium or media. The computer-executable instructions can include a routine, a sub-routine, programs, a thread of execution, and/or the like. Still further, results of acts of the methodologies can be stored in a computer-readable medium, displayed on a display device, and/or the like.

With reference solely to FIG. 7, a flow diagram illustrating an exemplary methodology 700 for ranking search results based upon weights assigned to hyperlinks is illustrated. The methodology 700 starts at 702, and at 704 a first webpage is rendered, wherein the first webpage comprises a first hyperlink to a second webpage and a second hyperlink to a third webpage. At 706, a first value for a feature of the first hyperlink is identified in the image of the webpage. For example, the feature may be position, and therefore the first value for the feature can identify a position of the first hyperlink in the image of the webpage. At 708, in the rendered webpage a second value for the feature for the second hyperlink is identified. Continuing with the example set forth above, the second value may identify the position of the second hyperlink in the image of the webpage.

At 710, a first weight is assigned to the first hyperlink based upon the first value for the feature, and at 712 a second weight is assigned to the second hyperlink based upon the second value for the feature. For instance, when the first value for the feature and the second value for the feature indicate that the first hyperlink is positioned above the second hyperlink in the webpage, the first weight assigned to the first hyperlink may be greater than the second weight assigned to the second hyperlink.

At 714, a first static score is computed for the second webpage based upon the first weight assigned to the first hyperlink in the webpage. At 716 a second static score for the third webpage is computed based upon the second weight assigned to the second hyperlink in the webpage. The first score may be assigned to the second webpage in a search engine index while the second score may be assigned to the third webpage in the search engine index.

At 718, a query is received from a client computing device, and at 720 search results are identified based upon the query, wherein the second webpage and the third webpage are included in the search results. Thus, in this example, the second webpage and the third webpage have been identified as being germane to the query. At 722, the search results are ranked based upon static scores assigned to webpages in the search results such that the second webpage is positioned relative to the third webpage in the ranked list of search results based upon the first static score computed for the second webpage and the second static score computed for the third webpage. The methodology 700 completes at 724.

Now referring to FIG. 8, a flow diagram illustrating an exemplary methodology 800 for assigning weights to hyperlinks in a webpage is illustrated. The methodology starts at 802, and at 804 an image of a webpage is generated, wherein the webpage includes a first hyperlink to a second webpage and a second hyperlink to a third webpage.

At 806, sections in the webpage are identified based upon the image of the webpage. For example, as described previously, bounding boxes can be drawn around portions of the webpage that may potentially be sections and sections can be identified based upon text in the webpage. At 808, a determination is made that a first section in the sections includes the first hyperlink, and at 810 a determination is made that a second section in the sections includes the second hyperlink, wherein the first section is different from the second section.

At 812, a first weight is assigned to the first hyperlink based upon the determination that the first section includes the first hyperlink, and at 814 a second weight is assigned to the second hyperlink based upon the determination that the second section includes the second hyperlink. For example, when the first section is a "title" section and the second section is a "sidebar" section, the first weight may be greater than the second weight. The methodology 800 completes at 816.

Figure 9:
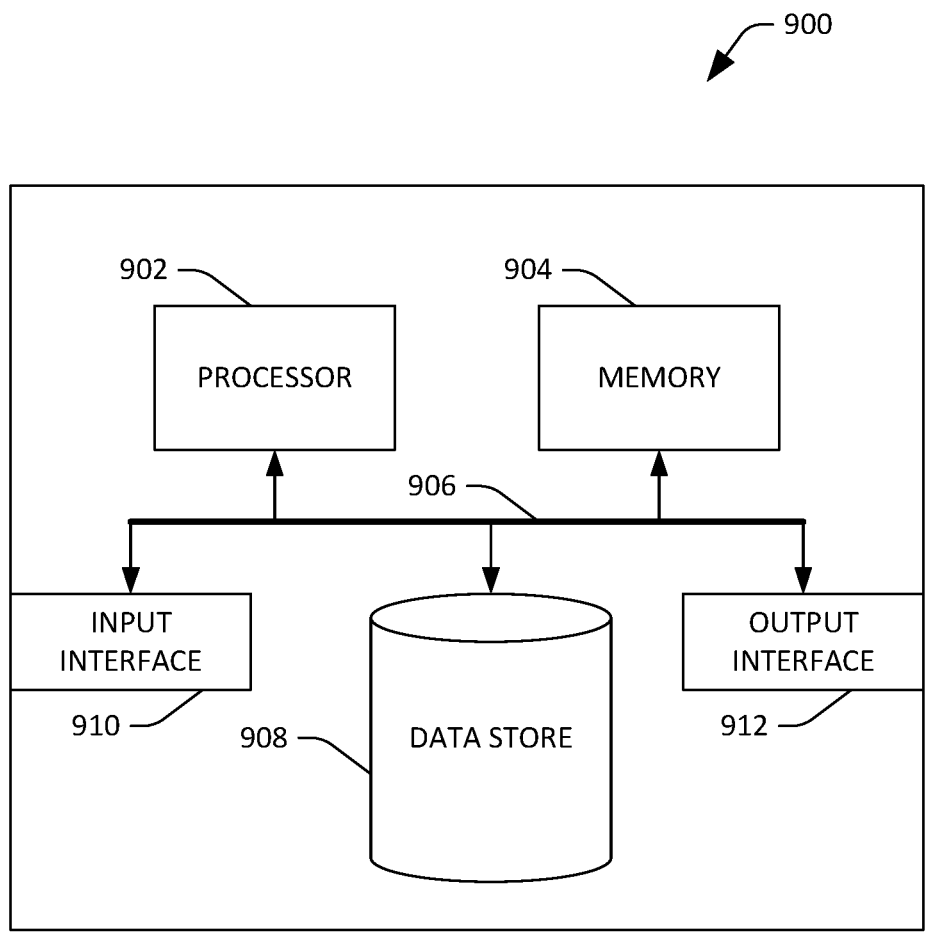
FIG. 9 illustrates an exemplary computing system.

Referring now to FIG. 9, a high-level illustration of an exemplary computing device 900 that can be used in accordance with the systems and methodologies disclosed herein is illustrated. For instance, the computing device 900 may be used in a system that assigns weights to hyperlinks in a webpage. By way of another example, the computing device 900 can be used in a system that is configured to rank webpages based upon static scores assigned to such webpages. The computing device 900 includes at least one processor 902 that executes instructions that are stored in a memory 904. The instructions may be, for instance, instructions for implementing functionality described as being carried out by one or more components discussed above or instructions for implementing one or more of the methods described above. The processor 902 may access the memory 904 by way of a system bus 906. In addition to storing executable instructions, the memory 904 may also store values for features that pertain to hyperlinks, static scores for webpages, semantic information for text, etc.

The computing device 900 additionally includes a data store 908 that is accessible by the processor 902 by way of the system bus 906. The data store 908 may include executable instructions, webpages, a search engine index, etc. The computing device 900 also includes an input interface 910 that allows external devices to communicate with the computing device 900. For instance, the input interface 910 may be used to receive instructions from an external computer device, from a user, etc. The computing device 900 also includes an output interface 912 that interfaces the computing device 900 with one or more external devices. For example, the computing device 900 may display text, images, etc. by way of the output interface 912.

It is contemplated that the external devices that communicate with the computing device 900 via the input interface 910 and the output interface 912 can be included in an environment that provides substantially any type of user interface with which a user can interact. Examples of user interface types include graphical user interfaces, natural user interfaces, and so forth. For instance, a graphical user interface may accept input from a user employing input device(s) such as a keyboard, mouse, remote control, or the like and provide output on an output device such as a display. Further, a natural user interface may enable a user to interact with the computing device 900 in a manner free from constraints imposed by input device such as keyboards, mice, remote controls, and the like. Rather, a natural user interface can rely on speech recognition, touch and stylus recognition, gesture recognition both on screen and adjacent to the screen, air gestures, head and eye tracking, voice and speech, vision, touch, gestures, machine intelligence, and so forth.

Additionally, while illustrated as a single system, it is to be understood that the computing device 900 may be a distributed system. Thus, for instance, several devices may be in communication by way of a network connection and may collectively perform tasks described as being performed by the computing device 900.

Various functions described herein can be implemented in hardware, software, or any combination thereof. If implemented in software, the functions can be stored on or transmitted over as one or more instructions or code on a computer-readable medium. Computer-readable media includes computer-readable storage media. A computer-readable storage media can be any available storage media that can be accessed by a computer. By way of example, and not limitation, such computer-readable storage media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, include compact disc (CD), laser disc, optical disc, digital versatile disc (DVD), floppy disk, and Blu-ray disc (BD), where disks usually reproduce data magnetically and discs usually reproduce data optically with lasers. Further, a propagated signal is not included within the scope of computer-readable storage media. Computer-readable media also includes communication media including any medium that facilitates transfer of a computer program from one place to another. A connection, for instance, can be a communication medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio and microwave are included in the definition of communication medium. Combinations of the above should also be included within the scope of computer-readable media.

Alternatively, or in addition, the functionally described herein can be performed, at least in part, by one or more hardware logic components. For example, and without limitation, illustrative types of hardware logic components that can be used include Field-programmable Gate Arrays (FPGAs), Program-specific Integrated Circuits (ASICs), Program-specific Standard Products (ASSPs), System-on-a-chip systems (SOCs), Complex Programmable Logic Devices (CPLDs), etc.

What has been described above includes examples of one or more embodiments. It is, of course, not possible to describe every conceivable modification and alteration of the above devices or methodologies for purposes of describing the aforementioned aspects, but one of ordinary skill in the art can recognize that many further modifications and permutations of various aspects are possible. Accordingly, the described aspects are intended to embrace all such alterations, modifications, and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A computing system that is configured to rank webpages in response to receipt of a query, the computing system comprising:
   a processor; and
   memory storing instructions that, when executed by the processor, cause the processor to perform acts comprising:
   receiving the query from a client computing device;
   identifying a plurality of webpages as being germane to the query, wherein the plurality of webpages includes a first webpage, and further wherein a second webpage includes a hyperlink that points to the first webpage; and ordering the plurality of webpages into a ranked list, wherein the first webpage is positioned in the ranked list based upon a static score assigned to the first webpage, wherein the static score is based upon a weight assigned to the hyperlink in the second webpage, wherein the weight is assigned to the hyperlink based upon a value of a feature of the hyperlink, wherein the second webpage comprises several hyperlinks with different weights assigned thereto, and further wherein the value of the feature of the hyperlink is generated based upon a rendered image of the second webpage.

2. The computing system of claim 1, wherein the value of the feature of the hyperlink is a label assigned to the hyperlink that identities a section of the second webpage that includes the hyperlink in the rendered image of the second webpage.

3. The computing system of claim 1, wherein the value of the feature of the hyperlink identifies a location of the hyperlink in the second webpage in the rendered image of the second webpage.

4. The computing system of claim 1, wherein the value of the feature of the hyperlink is a size of anchor text of the hyperlink.

5. The computing system of claim 1, wherein a third webpage is positioned in the ranked list based upon a second static score assigned to the third webpage, wherein the second static score is based upon a second weight assigned to a second hyperlink in the second webpage, the second hyperlink points to the third webpage, the second weight is assigned to the second hyperlink based upon a second value of the feature, and further wherein the second weight is different from the weight.

6. The computing system of claim 5, wherein the second weight is greater than the weight due to the second hyperlink being positioned above the hyperlink in the second webpage when the second webpage is rendered.

7. The computing system of claim 1, wherein the weight assigned to the hyperlink is based upon a value of a second feature of the hyperlink, wherein the value of the second feature indicates whether a named entity in anchor text of the hyperlink matches a named entity in text of the first webpage.

8. The computing system of claim 1, wherein the static score assigned to the first webpage is based upon a second weight assigned to a second hyperlink in a third webpage, where the second hyperlink points to the first webpage, and further wherein the second weight is based upon a position of the second hyperlink in the third webpage.

9. A method executed by at least one processor of a computing system, the method comprising:
rendering a first webpage, wherein the first webpage includes a hyperlink that points to a second webpage;
generating an image of the first webpage;
assigning a weight to the hyperlink in a first webpage, wherein the weight is assigned based upon a value of a feature that pertains to the hyperlink, and further wherein the value of the feature is generated based upon the image of the first webpage;
computing a static score for the second webpage based upon the weight assigned to the hyperlink;
assigning the static score to the second webpage in a search engine index;
receiving a query from a client computing device subsequent to assigning the static score to the second webpage;
searching the search engine index based upon the received query, wherein a plurality of webpages are identified as being relevant to the query, and further wherein the plurality of webpages include the second webpage;
ordering the plurality of webpages into a ranked list of webpages, wherein the second webpage is positioned in the ranked list of webpages based upon the static score assigned to the second webpage; and
transmitting the ranked list of webpages to the client computing device.

10. The method of claim 9, further comprising:
assigning a second weight to a second hyperlink in the first webpage, wherein the second weight is assigned based upon a second value of the feature, wherein the second hyperlink points to a third webpage, and further wherein the second weight is different from the first weight; and
computing a second static score for the third webpage based upon the second weight assigned to the second hyperlink, wherein the plurality of webpages includes the third webpage, and further wherein the third webpage is positioned in the ranked list of webpages based upon the second static score assigned to the third webpage.

11. The method of claim 9, further comprising:
identifying sections of the first webpage based upon the image of the rendered first webpage;
identifying a section in the sections that includes the hyperlink; and
assigning a label to the hyperlink based upon the section that is identified as including the hyperlink, wherein the value of the feature is the label assigned to the hyperlink.

12. The method of claim 11, wherein the label indicates that the hyperlink is included in one of a title of the first webpage, a body of the first webpage, a sidebar of the first webpage, or a footer of the first webpage.

13. The method of claim 11, wherein identifying sections of the first webpage comprises identifying boundaries of the sections of the first webpage, and further wherein identifying the section in the sections that includes the hyperlink comprises:
identifying a position of the hyperlink in the webpage; and
ascertaining that the position of the hyperlink is within an identified boundary of the section.

14. The method of claim 11, wherein the sections of the first webpage are identified based upon semantic information in text of the first webpage as output by a natural language processing module.

15. The method of claim 9, wherein the value of the feature identifies a location of the hyperlink on the first webpage when the first webpage is rendered.

16. The method of claim 9, wherein the value of the feature is size of anchor text of the hyperlink on the first webpage when the first webpage is rendered.

17. A computer-readable storage medium comprising instructions that, when executed by a processor, cause the processor to perform acts comprising:
receiving a query from a client computing device;
identifying a plurality of webpages as being germane to the query; and
ordering the plurality of webpages into a ranked list, wherein a first webpage is positioned in the ranked list based upon a static score assigned to the first webpage, wherein the static score is based upon a weight assigned to a hyperlink in a second webpage, the hyperlink points to the first webpage, wherein the weight is assigned to the hyperlink based upon a value of a feature of the hyperlink, wherein the value of the feature indicates whether a named entity in anchor text of the hyperlink matches a named entity in text of the second webpage, and further wherein the second webpage comprises several hyperlinks with different weights assigned thereto.

18. The computer-readable storage medium of claim 17, wherein the weight is assigned to the hyperlink based upon a value of a second feature of the hyperlink, wherein the value of the second feature of the hyperlink is a label assigned to the hyperlink that identifies a section of the second webpage that includes the hyperlink when the second webpage is rendered.

19. The computer-readable storage medium of claim 17, wherein the weight is assigned to the hyperlink based upon a value of a second feature of the hyperlink, wherein the value of the second feature of the hyperlink identifies a location of the hyperlink in the second webpage when the second webpage is rendered.

20. The computer-readable storage medium of claim 17, wherein the value of the feature is generated based upon a rendered image of the second webpage.

\* \* \* \* \*